United States Patent
Bocquet

(10) Patent No.: US 8,290,022 B2
(45) Date of Patent: Oct. 16, 2012

(54) SPREAD TRANSMISSION METHOD WITH POWER ALLOCATION PER USER AND PER SYMBOL

(75) Inventor: Wladimir Bocquet, Maisons Laffitte (FR)

(73) Assignee: France Telecom, Paris (FR)

( * ) Notice: Subject to any disclaimer, the term of this patent is extended or adjusted under 35 U.S.C. 154(b) by 811 days.

(21) Appl. No.: 12/439,859

(22) PCT Filed: Sep. 6, 2007

(86) PCT No.: PCT/FR2007/051879
§ 371 (c)(1),
(2), (4) Date: May 28, 2009

(87) PCT Pub. No.: WO2008/029061
PCT Pub. Date: Mar. 13, 2008

(65) Prior Publication Data
US 2009/0245329 A1 Oct. 1, 2009

(30) Foreign Application Priority Data
Sep. 6, 2006 (FR) ..................................... 06 53595

(51) Int. Cl.
*H04B 1/00* (2006.01)
(52) U.S. Cl. ........ 375/146; 375/130; 375/140; 375/135; 375/260; 375/259
(58) Field of Classification Search .................. 375/146, 375/130, 140, 135, 260, 259
See application file for complete search history.

(56) References Cited

U.S. PATENT DOCUMENTS

| | | | |
|---|---|---|---|
| 6,137,841 A | 10/2000 | Velez et al. | |
| 7,599,440 B2 * | 10/2009 | Won et al. | 375/260 |
| 7,620,096 B2 * | 11/2009 | Bar-Ness et al. | 375/144 |
| 2004/0047426 A1 * | 3/2004 | Nissani Nissensohn | 375/259 |
| 2005/0032514 A1 | 2/2005 | Sadri et al. | |
| 2005/0157670 A1 * | 7/2005 | Tang et al. | 370/320 |
| 2005/0249298 A1 * | 11/2005 | Kim et al. | 375/260 |
| 2006/0045195 A1 * | 3/2006 | Ok et al. | 375/260 |
| 2006/0078059 A1 * | 4/2006 | Ok et al. | 375/260 |

FOREIGN PATENT DOCUMENTS
WO 2006/068565 A1 6/2006

OTHER PUBLICATIONS

Atarashi et al., "Variable Spreading Factor-Orthogonal Frequency and Code Division Multiplexing (VSF-OFCDM) for Broadband Packet Wireless Access," IEICE Trans. Commun., vol. E86-B (1), pp. 291-299 (Jan. 2003).

* cited by examiner

*Primary Examiner* — Kenneth Lam
(74) *Attorney, Agent, or Firm* — Drinker Biddle & Reath LLP

(57) ABSTRACT

The present invention relates to a transmission method for a transmitter having Nt transmit antennas. The method (1) spreads symbols in two dimensions by means of a spreading code, the symbols coming from a signal for transmission over Nfft sub-carriers via the Nt transmit antennas. The signal is transmitted with a power $pe_m^{(k)}$ that is determined per symbol m, per user k=1, . . . , Nu, and per transmit antenna. The principle of the method (1) is to determine (2) a set of powers $pe_m^{(k)}$ that is constant over a symbol frame, with the distribution of power amongst the users minimizing an overall error criterion under the constraint that the sum of the powers $pe_m^{(k)}$ in the set is equal to the product of the number of users multiplied by the average power emitted per symbol over the users.

15 Claims, 3 Drawing Sheets

SPREAD TRANSMISSION METHOD WITH POWER ALLOCATION PER USER AND PER SYMBOL

CROSS-REFERENCE TO RELATED APPLICATIONS

This application is the U.S. national phase of the International Patent Application No. PCT/FR2007/051879 filed Sep. 6, 2007, which claims the benefit of French Application No. 06 53595 filed Sep. 6, 2006, the entire content of which is incorporated herein by reference.

FIELD OF THE INVENTION

The present invention relates in general to so-called digital communications, which form part of the field of telecommunications. Digital communications comprise in particular both wired communications and wireless communications in which the transmission channel is over the air. Within this field, the invention relates to methods of transmission and more particularly to transmission techniques using spreading in two dimensions for multi-carrier systems. Spreading in each of the dimensions is obtained by weighted duplication using a spreading code that makes it possible to superpose samples relating to different users. These techniques comprise in particular techniques of the orthogonal frequency code division multiplex (OFCDM) type, also known as multi-carrier code division multiple access (MC-CDMA), using spreading in the time and the frequency domains.

BACKGROUND OF THE INVENTION

An essential characteristic of MC-CDMA type transmission techniques is to compensate for the loss of data rate caused by duplicating symbols with an increase in data rate obtained by stacking a plurality of symbols from different users over the same time interval or over the same carrier frequency. FIG. 1 illustrates this effect on stacking symbols from different users over time and frequency axes, the stacking being obtained by spreading in the time and frequency domains. Furthermore, a characteristic that is common to multi-carrier techniques is a reduction in bit rate for each sub-carrier while providing a higher transmission bit rate by using these sub-carriers simultaneously. The frequency band is subdivided into small ranges, each allocated to a respective different sub-carrier. The sub-carriers are mutually orthogonal. This property is obtained by the sub-carriers being spaced apart relative to one another by a multiple of the reciprocal of the symbol duration. A sub-carrier modulation system can serve to provide immunity against a selective frequency fade occurring during transmission over the channel, because not all of the sub-carriers are subjected to said fading simultaneously. Nevertheless, in order to counter the fading phenomenon, the transmission channel must nevertheless be estimated and corrected for each sub-carrier on reception of the transmitted signal.

An MC-CDMA transmitter performs various processes on incoming high bit rate binary data in order to generate a so-called MC-CDMA signal that is transmitted over the channel. Thus, the high bit rate binary data is coded, e.g. using a convolution code, and it is modulated, e.g. using modulation of the xPSK type (x phase shift keying) or of the xQAM type (x quadrature amplitude modulation), with it being possible for coding and modulation to differ between users. The modulated data is then converted into parallel form as a plurality of modulated data streams at low bit rate. Time spreading is obtained firstly by duplicating each low bit rate modulated data unit, referred to as a "symbol", so as to obtain $SF_t$ symbols from a given low bit rate modulated symbol, and multiplying each symbol by a time spreading code element (referred to as a "chip"), and secondly by paralleling these various weighted symbols in the time domain so that they are typically modulated by sub-carriers in respective different MC-CDMA symbols. FIG. 2 is an illustration thereof in the time-frequency spreading plane. Each initial stream is thus duplicated to give $SF_t$ streams of symbols that result from time spreading. In the illustration, the time-spread symbols are distributed respectively over successive different orthogonal symbols. Spreading in the frequency domain is obtained by duplicating several times over each of the symbols that result from time spreading, in order to obtain a total of $SF_f$ symbols, by multiplying each of the $SF_f$ symbols respectively by a frequency spreading code chip, and by sharing them over $SF_f$ sub-carriers of an orthogonal modulator. The modulator generates MC-CDMA orthogonal symbols. After time and frequency modulation, each spread symbol that modulates sub-carrier p, where p=0, 1, ..., Nc−1, and where Nc is the number of sub-carriers, can be written using the following condensed form:

$$x_{p,n}^{(k)} = d_{\lfloor p/SF_f \rfloor, \lfloor n/SF_t \rfloor}^{(k)} \times c_{(p \bmod SF_f),(n \bmod SF_t)}^{(k)} \tag{1}$$

with:

$d_{m,j}$ (m=0, 1, ..., Nc/$SF_f$−1; j=0, 1, ..., Nd/$SF_t$−1) the modulated data or symbols;

$c_{i,q}$ (i=0, 1, ..., $SF_f$−1, q=0, 1, ..., $SF_t$−1) the two-dimensional code sequence;

$\lfloor z \rfloor$ the greatest integer value less than or equal to z, i.e. the integer portion of z;

k the user index; and n the index of the MC-CDMA symbol, n=0, 1, ..., Nd−1, where Nd is the number of MC-CDMA symbols in a frame.

The spreading factor SF is expressed in the form $SF = SF_f \times SF_t$ with $SF_t$ and $SF_f$ being the spreading values respectively in the time domain and in the frequency domain. The number of input data items modulated in a frame is given by the relationship:

$$(Nc \times Nd)/(SF_t \times SF_f)$$

The multiplexer multiplexes the spread symbols belonging to different users for a given MC-CDMA symbol n and a given carrier p. This multiplexing function can be expressed by the relationship:

$$x_{p,n} = \sum_{k=0}^{N_u-1} x_{p,n}^{(k)} \tag{2}$$

The multiplexer positions the symbols $x_{p,n}$ at the input to the inverse discrete Fourier transform modulator (IDFT) in register with the sub-carriers corresponding to their respective indices p.

The symbols $x_{p,n}$ are converted into an MC-CDMA orthogonal symbol by frequency division obtained by the inverse discrete Fourier transform with Nfft points. The duration of an MC-CDMA symbol is thus given by:

$$Td = Nfft \times Tfft$$

where Tfft is the inverse of the inter-carrier spacing.

The resulting MC-CDMA orthogonal symbols are converted into analog form by a digital-to-analog converter (DAC) to generate an MC-CDMA signal and they are converted by a frequency up-converter (U/C) to a radio frequency (RF) band for transmission over the transmission channel.

Typically an MC-CDMA system transmits $N_{FFT}$ symbols $x_{p,n}$ during the $n^{th}$ MC-CDMA orthogonal symbol period over Nfft sub-channels determined by sub-carriers at a spacing of $\Delta F=1/Tfft$.

To combat inter-symbol interference (ISI) and inter-carrier interference (ICI), a guard interval (GI) of Ng points such as a cyclic prefix (CP) or zero padding (ZP) is added to each MC-CDMA orthogonal symbol. This guard interval makes it possible to ensure that MC-CDMA orthogonal symbols do not overlap, providing the transmission delay is shorter than the duration of this interval. The total duration Tg of the guard interval is equal to:

$$Tg=Ng\times Tfft$$

where Tfft is the duration of a sample of the FFT, given that the duration of an MC-CDMA orthogonal symbol is equal to:

$$Td=Nfft\times Tfft$$

The MC-CDMA signal is then expressed in the following form:

$$s^{(k)}(t) = \frac{1}{\sqrt{Nfft}} \times \sum_{n=0}^{Nd-1} \sum_{p=0}^{Nfft-1} x_{p,n}^{(k)} \times e^{j2\pi p(t-n(Nfft+Ng))/Nfft} \times u(t-n(Td+Tg)) \quad (3)$$

in which expression the term u(t) is the gate function defined over the interval [0, Td+Tg] and $x_{p,n}$ is the component relating to user k of the transmitted signal that modulates the $p^{th}$ sub-carrier of the $n^{th}$ MC-CDMA symbol.

Assuming that the transmission channel is made up of P discrete paths each characterized by a respective amplitude and delay, the impulse response in baseband of the channel for user k can be expressed in the form:

$$h^{(k)}(t,\tau) = \sum_{p=0}^{P-1} \alpha_p^{(k)}(t) \cdot \delta(\tau - \tau_p) \quad (4)$$

with $\alpha_p$ and $\tau_p$ being respectively the complex channel gain and the delay of the $p^{th}$ path referred to as the spread delay. The total power transmitted by the channel over the various sub-carriers is normalized to 1. It is also assumed that:

$$\tau_{max}=\max \tau_j < (Td+Tg)$$

equals the duration of an MC-CDMA symbol. This relationship is satisfied by adapting the duration of the guard interval to the characteristics of the transmission channel.

The channel is assumed to be modeled by a finite impulse response (FIR) filter of order L−1, where L is the number of time samples corresponding to the maximum delay $\tau_p$. The transfer function $H^{(k)}(t,f)$ of the channel for user k can be expressed in the frequency domain in the following form:

$$H^{(k)}(t,f) = \sum_{p=0}^{P-1} \alpha_p^{(k)}(t) \cdot \exp(-j2\pi f \tau_p) \quad (5)$$

The coefficients $\alpha_p^{(k)}$ of the impulse response are estimated using known methods that rely on making use of pilot symbols.

On reception, the signal received by a receiver is filtered by a bandpass filter (BPF) and is down-converted (D/C) into baseband. The signal is sampled by an analog-to-digital converter (ADC). After suppressing the guard interval, the sampled data is fed to a discrete Fourier transform (DFT) with Nfft points and is demultiplexed into as many branches as there are sub-carriers.

After demultiplexing, the component modulating the $p^{th}$ sub-carrier of the $n^{th}$ received OFCDM symbol is expressed in the following form:

$$y_{n,p} = \frac{1}{\sqrt{Nfft}} \cdot \sum_{i=0}^{Nfft-1} r_{n,i} \cdot e^{-j2\pi pi/Nfft} \quad (6)$$

When the maximum of the delays $\tau_p$ (spread delay) is less than the guard interval, the component modulating the $p^{th}$ sub-carrier of the $n^{th}$ received OFCDM symbol can be expressed in the form:

$$y_{p,n}^{(k)} = h_p^{(k)} \times x_{p,n}^{(k)} + n_{p,n}^{(k)} \quad (7)$$

To reduce the effects of channel distortion, which can give rise to a loss of orthogonality between different users, it is known to compensate the channel in the frequency domain sub-carrier by sub-carrier, using coefficients $G_p^{(k)}$ that are determined in application in particular of a minimum mean square error (MMSE) criterion, an equal gain combining (EGC) criterion, or a zero forcing (ZF) criterion. Thereafter, for each branch, the data is de-spread, demodulated, and decoded. This compensation amounts to multiplying the received signal by the reciprocal of the channel gain for a given sub-carrier. This compensation can be performed by the user taking account of the coefficients of the channel as given by the following relationship (8):

$$G_p^{(k)} = \begin{cases} \frac{\hat{H}_p^{(k)*}}{|\hat{H}_p^{(k)}|^2} (ZF) \\ \frac{\hat{H}_p^{(k)*}}{|\hat{H}_p^{(k)}|} (EGC) \\ \frac{\hat{H}_p^{(k)*}}{Nu \cdot |\hat{H}_p^{(k)}|^2 + \sigma_n^2} (MMSE) \end{cases} \quad (8)$$

This method has the drawback of increasing the noise level on reception, in particular when the channel gain value is small, which configuration is typically encountered during fading.

SUMMARY OF THE INVENTION

Thus, the invention proposes a multi-carrier transmission method for a system having at least one transmit antenna and at least one receive antenna separated by a transmission channel, the method serving to transmit orthogonal symbols from a modulation module for using Nfft orthogonal functions that define Nfft sub-carriers on which symbols are modulated that are representative of incoming information data presented in frames and associated with Nu users, the method serving to combat fading phenomena while limiting the increase in noise level on the received signal.

The proposed method is of the type in which, prior to orthogonal modulation, the symbols are spread in two dimensions by means of a spreading code, the number of elements constituting the code determining the maximum number of users Numax, the number of users Nu being determined to be less than or equal to this maximum. The method is remarkable in that it determines a set of powers $pe_m^{(k)}$ transmitted by an antenna per symbol m relating to a user k, which powers are constant over the duration of a frame, with the distribution of power amongst users k minimizing an overall error criterion under the constraint that the sum of the powers $pe_m^{(k)}$ of the set is equal to the product of the number of users Nu multiplied by the power transmitted by the transmit antenna per symbol averaged over the users, the signal transmitted by the transmit antenna being transmitted with the determined power $pe_m^{(k)}$ per symbol m and per user k, for k=1, . . . , Nu.

By searching for a set of transmitted powers that serve to minimize an overall error criterion per symbol, typically an overall bit error rate (BER), a method of the invention takes account of propagation conditions to adjust the shares of power transmitted amongst users and consequently enables the total transmitted power to be distributed optimally, thereby combating more effectively against the fading phenomena that are specific to one user. Such a method improves the overall efficiency of the system.

The overall error criterion is typically BER, but it could also be packet error rate (PER), which is an error measurement criterion commonly used in systems that implement channel coding that relies for example on a convolutional code, a turbo code, or a low density parity check (LDPC) code. In such "coded" systems, it is possible to use both overall error criteria, BER and PER.

In a particular implementation, the constraint takes account of a priority level amongst the users, which level is used to weight the powers $pe_m^{(k)}$ involved in making up the sum. This is particularly advantageous for combating specifically the negative effects of faulty receiver equipment requiring a high level of power regardless of the environment in which it is operating. Another advantage of this mode is to be able to privilege one user in terms of allocated power level compared with other users whose communications are being transmitted by the same transmitter.

BRIEF DESCRIBTION OF THE DRAWINGS

Other characteristics and advantages of the invention appear from the following description made with reference to the accompanying figures that are given as non-limiting examples.

DETAILED DESCRIBTION OF THE INVENTION

Figure 1:
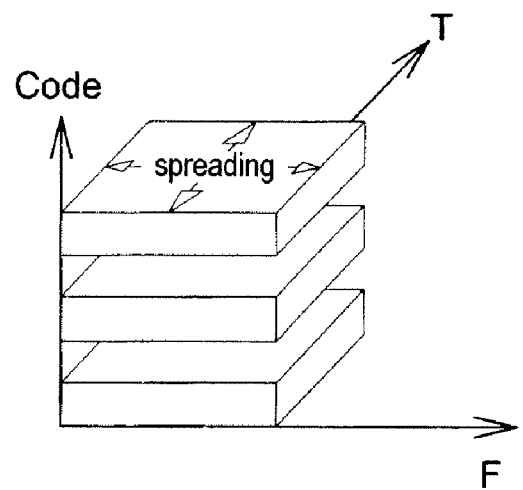
FIG. 1 illustrates the effect of taking symbols from different users and stacking them on the time and frequency axes by means of the spreading process in the time and frequency domains.
Figure 2:
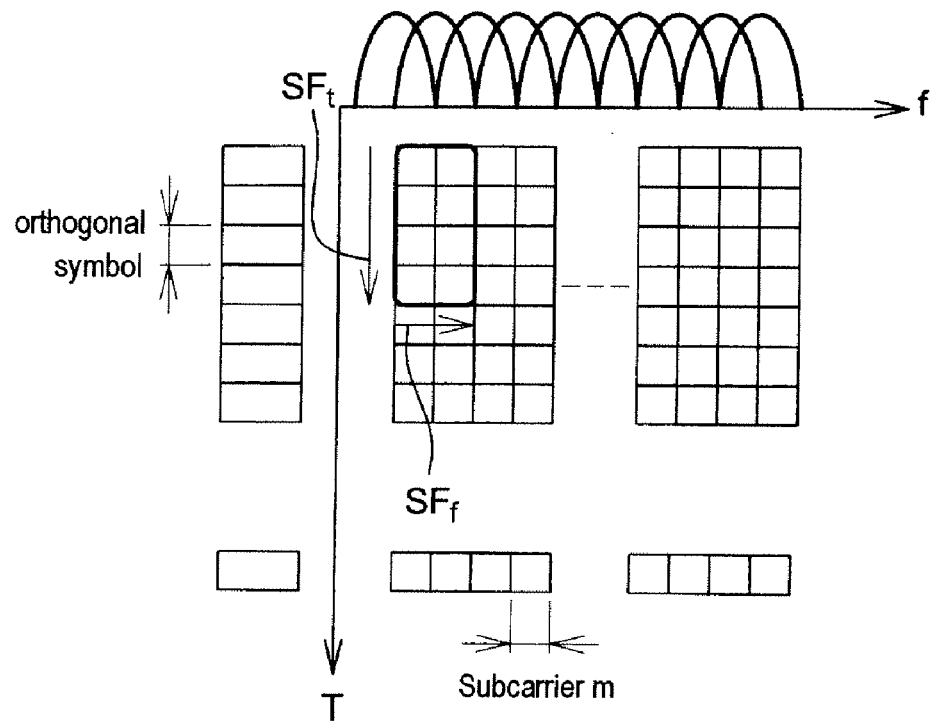
FIG. 2 illustrates the time-frequency spreading process.
Figure 3:
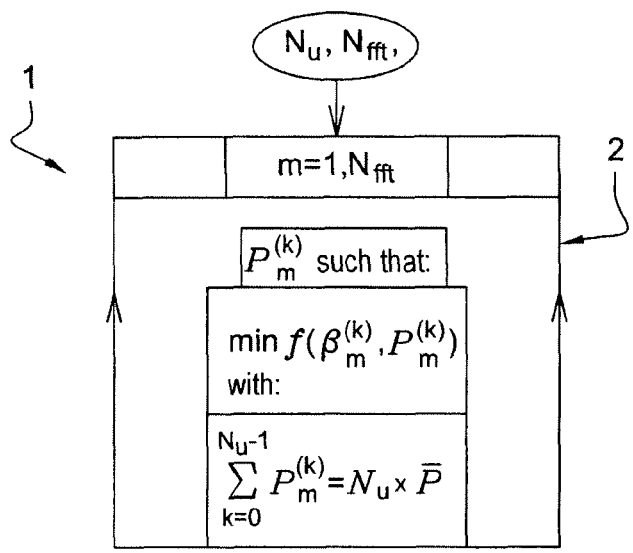
FIG. 3 is a flow chart of a method of the invention.

FIG. 3 is a flow chart of a multi-carrier transmission method of the invention. The method 1 has as its input data information data presented in frames and corresponding to Nu users, $Nu \geq 1$. Typically, the data corresponds to signals exchanged between terminals, for example fixed telephony terminals at the transmitter end and mobile terminals at the receiver end. More generally, the method is used for any telecommunication using a transmission channel with power being adapted on entry into the channel. The method is described below for a single-input single-output (SISO) system with MC-CDMA modulation, i.e. with one transmit antenna, Nt=1, and one receive antenna, Nr=1.

A multi-carrier method of transmitting orthogonal symbols, typically MC-CDMA, generally comprises various well-known processing stems, such as, in particular, channel coding, interleaving, and binary symbol coding based on modulation, e.g. of the xQAM or xPSK type. These well-known steps are not described.

The multi-carrier transmission method is of the type with symbol spreading prior to orthogonal modulation. The symbols are representative of incoming information data and they are typically derived from a binary symbol coding step. Spreading is performed in known manner in two dimensions by means of a spreading code. The number SF of elements making up the code determines the maximum number of users Nu that can be spread, $Nu \leq SF$. The two dimensions typically correspond to time and to frequency. The code is resolved into a time-spreading code comprising $SF_t$ chips and a frequency-spreading code comprising $SF_f$ chips. After spreading, the symbols may be expressed by relationship (1).

The symbols are spread in combination with orthogonal modulation. The orthogonal modulation forms orthogonal symbols each having a time index referred to as the orthogonal symbol time. This orthogonal modulation is typically orthogonal frequency division modulation (OFDM). The symbols as weighted by a spreading code chip are modulated by the various sub-carriers. The method transmits an output signal over the transmit antenna on Nfft sub-carriers, which transmitted signal is conveyed by the channel and may be expressed in the form given by equation (3).

The signal transmitted by the transmit antenna is transmitted with power $pe_m^{(k)}$ determined by the symbol m and by the user k=1, . . . , Nu. Each power $pe_m^{(k)}$ is constant over the duration of a frame, and may vary between frames.

The method includes a step 2 of determining a set of powers $pe_m^{(k)}$ per symbol m, that are constant over the duration of a frame and that are shared amongst users k in such a manner as to minimize an overall error criterion. The overall error criterion is minimized under the constraint that the sum of the powers $pe_m^{(k)}$ of the set should be equal to the product of the number of users Nu with the power transmitted per symbol on average over the various users.

In an MC-CDMA system (also known as variable spread factor orthogonal frequency code division multiplexing (VSF-OFCDM)), there is little or no correlation between the channels for the various users. Over the duration of one frame and for one user, the channel is considered as having fading that is flat: power calculation is performed on a per-frame basis. The overall error criterion is typically selected as being the overall bit error rate (BER). By definition, BER is a function of the signal-to-noise ratio (SNR), i.e. of the channel transmission conditions and of the power pe transmitted by the transmit antenna. The relationship between BER and SNR can be expressed in the form $f(\beta, pe)$, where f is an exact function or an estimated function for the relationship that exists between the BER and the transmission conditions of the channel. In a channel with flat fading, this rate can be specified for each symbol m:

$$BER_m^{(k)} = f(B_m^{(k)}, pe_m^{(k)}) \quad (9)$$

and in approximate form:

$$BER_m^{(k)} \approx a \cdot \exp(-b \cdot \beta_m^{(k)} \cdot pe_m^{(k)}) \quad (10)$$

with:

$$\beta_m^{(k)} = \frac{SF_f}{(2^{N_m} - 1)\sigma_n^2 \times \sum_{q=0}^{SF_f - 1} |G_{q+SF_f \times m}^{(k)}|^2} \quad (11)$$

m=0, 1, ..., Nc/SF$_f$,–1

$N_m$ is the number of bits per symbol $d_{m,n}^{(k)}$ determined by the type of modulation used in the symbol binary coding;

$G_i^j$ is the channel compensation value obtained by relationship (8);

a=0.2 and b=1.5 are heuristic coefficients; and

σ represents the variance of the Gaussian white noise.

The overall BER is minimized when it is minimized for each user and for each frequency sub-band corresponding to a sub-carrier. To determine the minimum value, one solution consists in using a Lagrangian algorithm.

Minimization can be expressed as follows:

$$\min f(\beta_m^{(k)}, pe_m^{(k)}) \quad (12)$$

with $$\sum_{k=0}^{Nu-1} pe_m^{(k)} = Nu \times \overline{P} \quad (13)$$

Equations (12) and (13) represent the fact that the method minimizes the overall BER by determining the best set of transmitted powers for the various users for a symbol m under the constraint that the total transmitted power must be constant and unvarying. The total transmitted power is equal to the power transmitted per symbol m on average amongst the users, multiplied by the number of users.

Equations (12) and (13) can be solved by implementing a Lagrangian algorithm. For each sub-carrier, the Lagrangian can be expressed in the following form:

$$J(pe_m^{(0)}, \ldots, pe_m^{(Nu-1)}) = \quad (14)$$

$$\frac{1}{Nu} \sum_{k=0}^{Nu-1} f(\beta_m^{(k)}, pe_m^{(k)}) + \lambda \left( \sum_{k=0}^{Nu-1} pe_m^{(k)} - Nu \cdot \overline{P} \right)$$

To obtain a set of optimum transmitted powers, the method solves the following system of equations:

$$\begin{cases} \frac{1}{Nu} \cdot \frac{\partial}{\partial pe_m^{(k)}} \left( \sum_{k=0}^{Nu-1} f(\beta_m^{(k)}, pe_m^{(k)}) \right) + \lambda = 0 \; k = 0, \ldots, Nu-1 \\ \sum_{k=0}^{Nu-1} pe_m^{(k)} - Nu \cdot \overline{P} = 0 \end{cases} \quad (15)$$

By introducing the simplified estimate of the overall BER given by equation (10), the system (15) can be expressed in the following form:

$$\begin{cases} \frac{-a \cdot b \cdot \beta_m^{(k)}}{Nu} \cdot \exp(-b \cdot \beta_m^{(k)} \cdot pe_m^{(k)}) + \lambda = 0 \; k = 0, \ldots, Nu-1 \\ \sum_{k=0}^{Nu-1} pe_m^{(k)} - Nu \cdot \overline{P} = 0 \end{cases} \quad (16)$$

This leads to the following equation for the transmitted power determined for a symbol m and a user k:

$$pe_m^{(k)} = \left[ 1 + \sum_{\substack{u=0 \\ u \neq k}}^{Nu-1} \frac{\beta_m^{(k)}}{\beta_m^{(u)}} \right]^{-1} \cdot \left( Nu \cdot \overline{P} + \frac{1}{b} \cdot \sum_{\substack{u=0 \\ u \neq k}}^{N_U-1} \frac{1}{\beta_m^{(u)}} \cdot \log\left(\frac{\beta_m^{(k)}}{\beta_m^{(u)}}\right) \right) \quad (17)$$

Figure 4:
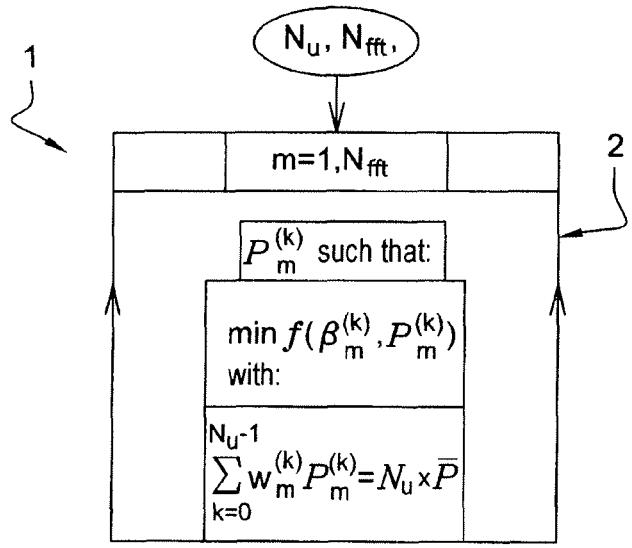
FIG. 4 is a flow chart of a first implementation of a method of the invention.

FIG. 4 is a flow chart of a first implementation of a method of the invention. In this implementation, the constraint takes account of a priority level, in terms of how power levels are allocated between users. This priority level weights each power $pe_m^{(k)}$ involved in the sum. Equation (13) becomes:

$$\sum_{k=0}^{Nu-1} w_m^{(k)} pe_m^{(k)} = Nu \times \overline{P} \quad (18)$$

The priority level may be determined as belonging to a scale having three levels, for example:

$$w_m^{(k)} = \begin{cases} \alpha^L, & L \text{ for low priority} \\ \alpha^M, & M \text{ for medium priority} \\ \alpha^H, & H \text{ for high priority} \end{cases} \quad (19)$$

Under such conditions, equation (17) becomes:

$$pe_m^{(k)} = \quad (20)$$

$$\left[ \beta_m^{(k)} \times \sum_{u=0}^{Nu-1} \frac{\beta_m^{(k)}}{\beta_m^{(u)}} \right]^{-1} \times \left( Nu \times \overline{P} + \frac{1}{b} \times \sum_{u=0}^{Nu-1} \frac{w_m^{(u)}}{\beta_m^{(u)}} \times \log\left( \frac{w_m^{(u)}}{\beta_m^{(u)}} \times \frac{\beta_m^{(k)}}{w_m^{(k)}} \right) \right)$$

Figure 5:
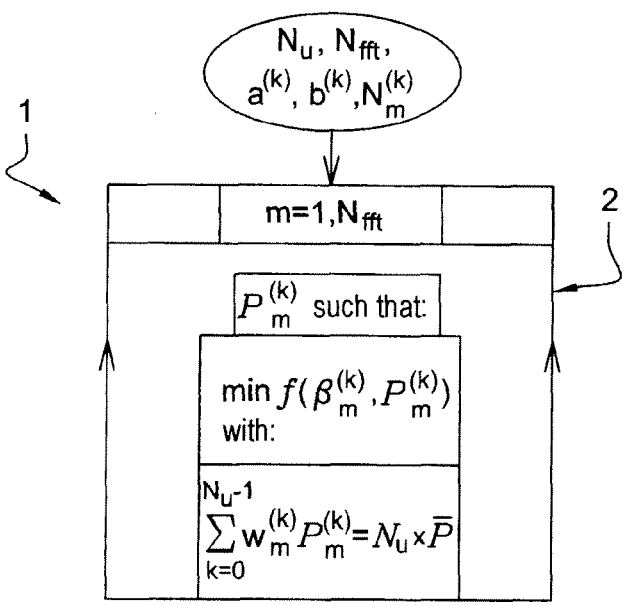
FIG. 5 is a flow chart of a second implementation of a method of the invention.

FIG. 5 is a flow chart of a second implementation of a method of the invention. In this implementation, the binary symbol coding is based on modulation that is adapted per user as a function of the channel. Thus, the method selects the type of modulation, xPSK or xQAM, depending on the user index k of the bits input to the coding. Under such conditions, the parameters a, b, and $N_m$ in equations (10) and (11) depend on the type of modulation that is selected, and thus on the user k:

$$BER_m^{(k)} \approx a^{(k)} \times \exp(-b^{(k)} \times \beta_m^{(k)} \times pe_m^{(k)}) \quad (21)$$

-continued $$\beta_m^{(k)} = \frac{SF_f}{(2^{N_m^{(k)}} - 1)\sigma_n^2 \times \sum_{q=0}^{SF_f-1} |G_{q+SF_f \times m}^{(k)}|^2} \quad (22)$$

Under such conditions, equation (17) becomes:

$$pe_m^{(k)} = \left[\sum_{u=0}^{Nu-1} \frac{b^{(k)}}{b^{(u)}} \times \frac{\beta_m^{(k)}}{\beta_m^{(u)}}\right]^{-1} \cdot \left(Nu \times \overline{P} + \sum_{u=0}^{Nu-1} \frac{1}{b^{(u)} \times \beta_m^{(u)}} \times \log\left(\frac{a^{(k)} \times b^{(k)} \times \beta_m^{(k)}}{a^{(u)} \times b^{(u)} \times \beta_m^{(u)}}\right)\right) \quad (23)$$

Figure 6:
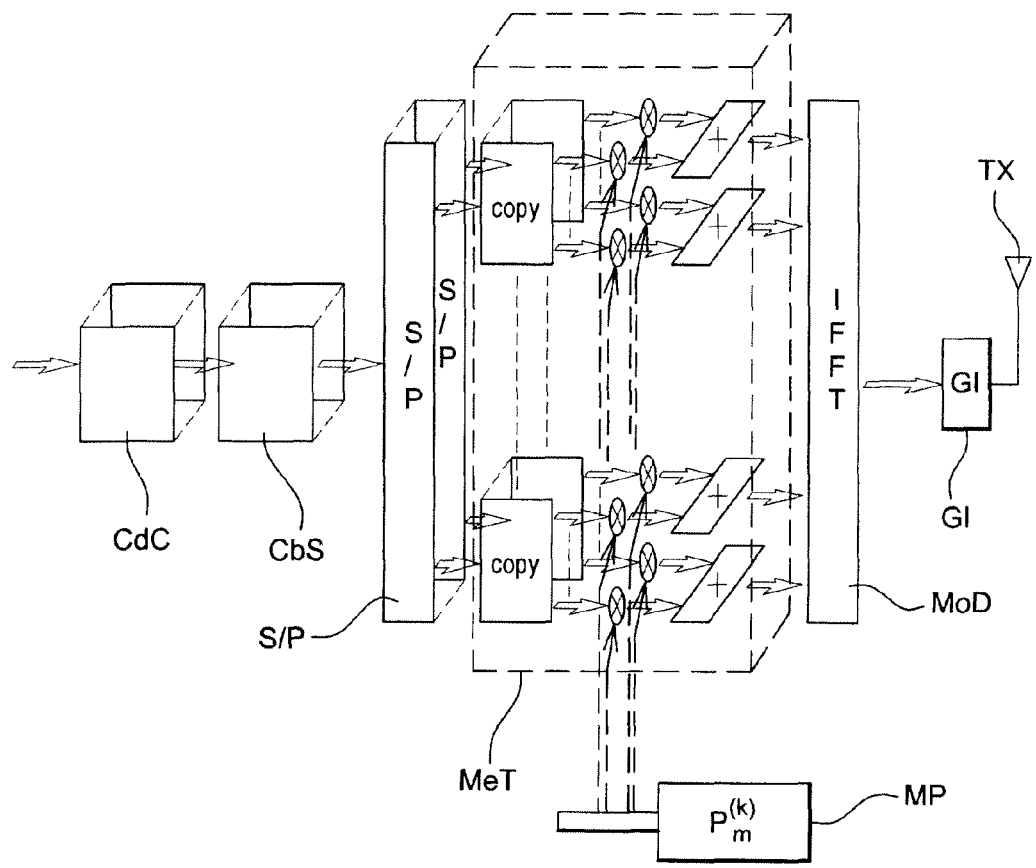
FIG. 6 is a block diagram of a transmitter of the invention making use of a particular implementation of the method of the invention.

FIG. 6 is a diagram of a particular embodiment of a transmitter of the invention. The transmitter EM comprises a channel coder CdC, a binary symbol coder CbS, a serial-to-parallel module S/P, a spreader module MeT, a module MoD for modulation by Nfft orthogonal functions, a power determining module MP, and a guard insertion module GI. The transmitter is connected to a transmit antenna TX.

The channel coder CdC codes the incoming information data associated with Nu users and puts the data into frames. This coder may be made up of as many coders as there are users.

The symbol binary coder CbS transforms binary data into symbols $d^{(k)}$ by modulation of the xPSK or of the xQAM type, for example. This coder may be made up of as many coders as there are users.

The S/P module puts the successive symbols in a buffer of size $k \times Nfft/SF_f$. The S/P module may be made of as many modules as there are users. Under such circumstances, each module puts the successive symbols in a buffer of size $Nfft/SF_f$.

The spreader module MeT spreads the symbols of the preceding buffer in the time and frequency domains, the symbols $x_{m,n}^{(k)}$ after spreading being expressible in a condensed form using equation (1).

The module MoD for orthogonal modulation by Nfft orthogonal functions performs orthogonal modulation, typically OFDM, on the symbols $x_{m,n}^{(k)}$ so as to generate the orthogonal symbols.

The module MP for determining the power calculates the power using equation (17), (20), or (23).

The module GI for inserting a guard interval inserts a guard interval between the orthogonal symbols. The output signal can be expressed by equation (3).

Figure 7:
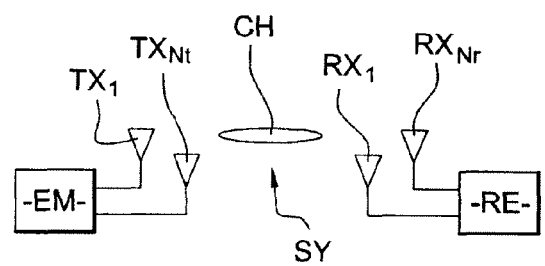
FIG. 7 is a diagram of a transmission system SY of the invention.

FIG. 7 is a diagram of a transmission system SY of the invention. The transmission system comprises a transmitter EM of the invention, Nt transmit antennas $TX_1, \ldots, TX_{Nt}$, Nr receive antennas $RX_1, \ldots, RX_{Nr}$, and a receiver RE. The transmit and receive antennas are separated by a transmission channel CH. The transmitter is connected to the Nt transmit antennas. The receiver is connected to the Nr receive antennas. The number Nt of transmit antennas and the number Nr of receive antennas is greater than or equal to one. Thus, the system may be a multiple-input multiple-output (MIMO) system.

Implementing the method of the invention in such a system amounts to the module for determining power determining a set of powers for each transmit antenna t using the following equation:

$$pe_m^{(k)(t)} = \left[\sum_{u=0}^{Nu-1} \frac{\beta_m^{(k)(t)}}{\beta_m^{(u)(t)}}\right]^{-1} \cdot \left(Nu \cdot \overline{P} + \frac{1}{b} \cdot \sum_{u=0}^{Nu-1} \frac{1}{\beta_m^{(u)(t)}} \cdot \log\left(\frac{\beta_m^{(k)(t)}}{\beta_m^{(u)(t)}}\right)\right) \quad (24)$$

A method of the invention can be implemented by various means. For example, the method may be implemented in hardware form, in software form, or by a combination of both.

For a hardware implementation, the module for determining a set of powers used for executing the various sets in the transmitter may be incorporated in one or more application specific integrated circuits (ASICs) in digital signal processors (DSPs, DSPDs), in programmable logic circuits (programmable logic devices (PLDs), field programmable gate arrays (FPGAs)), in controllers, microcontrollers, microprocessors, or any other electronic component designed to execute previously-described functions.

For a software implementation, some or all of the steps of a transmission method of the invention can be implemented by software modules executing previously-described functions. The software code may be stored in a memory and executed by a processor. The memory may form part of the processor or may be external to the processor, and be coupled thereto by means known to the person skilled in the art.

Consequently, the invention also provides a computer program, in particular a computer program on or in a data medium or memory, and adapted to implement the invention. The program may make use of any programming language, whether in the form of source code, of object code, or of code intermediate between source code and object code, such as in a partially compiled form, or in any other form that is desirable for implementing a method of the invention.

The data medium may be any entity or device capable of storing the program. By way of example, the medium may comprise storage means such as a read-only memory (ROM), e.g. in the form of a compact disk (CD-ROM) or a microelectronic circuit ROM, or indeed magnetic recording means, e.g. a floppy disk or a hard disk.

Furthermore, the data medium may be a transmission medium such as an electrical or optical signal, that may be conveyed via an electrical or optical cable, by radio, or by other means. The program of the invention may in particular be downloaded from a network of the Internet type.

The invention claimed is:

1. A multi-carrier transmission method of the type making use, prior to orthogonal modulation, of symbol spreading respectively on first and second dimensions including a frequency dimension, by means of a spreading code c of respective lengths in the two dimensions of $SF_t$ and $SF_f$, the number of elements making up the code determining a maximum number of users Numax, a number of users Nu being determined to be less than or equal to said maximum, the method being applied to transmitting orthogonal symbols over at least one transmit antenna, the orthogonal symbols coming from a module (MoD) for modulation by Nfft orthogonal functions determining Nfft sub-carriers from amongst Nc carriers, having spread symbols modulated thereon:

$$x_{p,n}^{(k)} = d_{\lfloor p/SFf \rfloor, \lfloor n/SFt \rfloor}^{(k)} \times c_{(p \bmod SFf), (n \bmod SFt)}^{(k)}$$

with:
- $d_{mj}$ (m=0, 1, ..., Nc/SF$_f$−1; j=0, 1, ..., Nd/SF$_t$−1) being the symbols;
- $C_{iq}$ (i=0, 1, ..., SF$_f$−1, q=0, 1, ..., SF$_t$−1) being the sequence of two-dimensional codes;
- p varying over the range 0 to Nc−1;
- k being the user index varying over the range 1 to Nu;
- n being the orthogonal symbol index varying over the range 0 to Nd−1;
- Nd being the number of orthogonal symbols in a frame;
- $\lfloor z \rfloor$ being the integer portion of z;

which symbols are representative of input information data presented in frames and associated with Nu users, the method further comprising:
a step of determining at least one set of powers $pe_m^{(k)}$ transmitted by an antenna per symbol of index m relating respectively to a user k, the powers being constant over the duration of a frame, with the distribution thereof amongst the users k minimizing an overall error criterion under the constraint that the sum of the powers $pe_m^{(k)}$ in the set is equal to the product of the number of users Nu with the power transmitted by the transmit antenna per symbol on average over the k users, the signal transmitted by the transmit antenna being transmitted with the powers $pe_m^{(k)}$ as determined per symbol of index m and per user k.

2. A multi-carrier transmission method according to claim 1, wherein the overall error criterion is minimized by means of a Lagrangian algorithm.

3. A multi-carrier transmission method according to claim 1, wherein the overall error criterion corresponds to an overall bit error rate (BER).

4. A multi-carrier transmission method according to claim 3, wherein the overall bit error rate is estimated by an exponential function.

5. A multi-carrier transmission method according to claim 1, wherein the overall error criterion corresponds to an overall packet error rate (PER).

6. A multi-carrier transmission method according to claim 1, wherein the constraint takes account of a priority level amongst users, which level weights each power $pe_m^{(k)}$ involved in the sum.

7. A multi-carrier transmission method according to claim 6, wherein the modulation is adaptable as a function of the user.

8. A multi-carrier transmission method according to claim 6, wherein transmission take place over Nt transmit antennas and wherein there are as many sets of determined powers as there are transmit antennas.

9. A multi-carrier transmission method according to claim 1, wherein the modulation is adaptable as a function of the user.

10. A multi-carrier transmission method according to claim 9, wherein transmission take place over Nt transmit antennas and wherein there are as many sets of determined powers as there are transmit antennas.

11. A multi-carrier transmission method according to claim 1, wherein transmission takes place over Nt transmit antennas and wherein there are as many sets of determined powers as there are transmit antennas.

12. A multi-carrier transmission method according to claim 11, wherein transmission take place over Nt transmit antennas and wherein there are as many sets of determined powers as there are transmit antennas.

13. A transmitter for a system having Nt transmit antennas and Nr receive antennas separated by a transmission channel, with Nt≧1 and Nr≧1, the transmitter being of the type making use, prior to orthogonal modulation, of symbol spreading respectively on first and second dimensions including a frequency dimension, by means of a spreading code c of respective lengths in the two dimensions of SF$_t$ and SF$_f$, the number of elements making up the code determining a maximum number of users Numax, a number of users Nu being determined to be less than or equal to said maximum, the transmitter comprising a module for modulation by Nfft orthogonal functions determining Nfft sub-carriers amongst Nc carriers, on which spread symbols are modulated:

$$x_{p,n}^{(k)} = d_{\lfloor p/SFf \rfloor, \lfloor n/SFt \rfloor}^{(k)} \times c_{(p \bmod SFf),(n \bmod SFt)}^{(k)}$$

with:
- $d_{mj}$ (m=0, 1, ..., Nc/SF$_f$−1; j=0, 1, ..., Nd/SF$_t$−1) being the symbols;
- $C_{iq}$ (i=0, 1, ..., SF$_f$−1, q=0, 1, ..., SF$_t$−1) being the sequence of two-dimensional codes;
- p varying over the range 0 to Nc−1;
- k being the user index varying over the range 1 to Nu;
- n being the orthogonal symbol index varying over the range 0 to Nd−1;
- Nd being the number of orthogonal symbols in a frame;
- $\lfloor z \rfloor$ being the integer portion of z;

which symbols are representative of input information data presented in frames and associated with Nu users, the transmitter further comprising:
a module for determining at least one set of powers $pe_m^{(k)}$ transmitted by an antenna per symbol of index m relating respectively to a user k, the powers being constant over the duration of a frame, with the distribution thereof amongst the users k minimizing an overall error criterion under the constraint that the sum of the powers $pe_m^{(k)}$ in the set is equal to the product of the number of users Nu with the power transmitted by the transmit antenna per symbol on average over the k users, the signal transmitted by the transmit antenna being transmitted with the powers $pe_m^{(k)}$ as determined per symbol of index m and per user k.

14. A transmission system including a transmitter according to claim 13.

15. A non-transitory data medium including program instructions adapted to implementing a transmission method for a system having Nt transmit antennas and Nr receive antennas separated by a transmission channel, the method according to claim 1, and being implemented when said program is loaded and executed in a transmitter.

* * * * *